US012086447B2

United States Patent
Hamidouche et al.

(10) Patent No.: US 12,086,447 B2
(45) Date of Patent: Sep. 10, 2024

(54) SYSTEMS AND METHODS FOR REDUCING INSTRUCTION CODE MEMORY FOOTPRINT FOR MULTIPLE PROCESSES EXECUTED AT A COPROCESSOR

(71) Applicant: ADVANCED MICRO DEVICES, INC., Santa Clara, CA (US)

(72) Inventors: Khaled Hamidouche, Austin, TX (US); Michael W. Lebeane, Austin, TX (US); Hari S. Thangirala, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 66 days.

(21) Appl. No.: 16/719,076

(22) Filed: Dec. 18, 2019

(65) Prior Publication Data

US 2021/0191641 A1 Jun. 24, 2021

(51) Int. Cl.
*G06F 3/06* (2006.01)
*G06F 12/0882* (2016.01)

(52) U.S. Cl.
CPC .......... *G06F 3/0647* (2013.01); *G06F 3/0611* (2013.01); *G06F 3/0659* (2013.01); *G06F 3/0688* (2013.01); *G06F 12/0882* (2013.01); *G06F 2212/7201* (2013.01)

(58) Field of Classification Search
None
See application file for complete search history.

(56) References Cited

U.S. PATENT DOCUMENTS

| 10,318,344 B2 | 6/2019 | Gutierrez |
| 10,365,824 B2 | 7/2019 | Smith et al. |
| 2017/0364449 A1* | 12/2017 | Liu ........................ G06F 9/5016 |
| 2019/0391750 A1* | 12/2019 | Gaillet ................ G06F 13/4282 |

OTHER PUBLICATIONS

"Speed UP Android Devices Using Swap [Part 1]"; Panos; Jan. 25, 2019; https://www.droidviews.com/speed-up-android-devices-using-swap-part-1/ (Year: 2019).*

* cited by examiner

*Primary Examiner* — Michael Alsip

(57) ABSTRACT

A processing system includes a first processor couplable to a first memory and a second memory. In response to a page migration trigger for a page in the first memory, the first processor is configured to, responsive to the page being a read-only page storing code for execution, initiate migration of the page to a code cache portion of a second memory associated with a second processor and shared by multiple processes executing at the second processor, and to configure each process of a set of processes executing at the second processor to access and execute the code from the code cache portion.

15 Claims, 5 Drawing Sheets

SYSTEMS AND METHODS FOR REDUCING INSTRUCTION CODE MEMORY FOOTPRINT FOR MULTIPLE PROCESSES EXECUTED AT A COPROCESSOR

BACKGROUND

Conventional processing systems utilize page migration to take advantage of spatial locality between source and destination memory locations in the processing system. Page migration refers to the transferring of a page from a source memory location to a destination memory location that is closer in proximity to the processor that executes processes that utilize the pages stored in the destination memory location. Using page migration allows the processing system to reduce the amount of time taken to access pages in memory. However, current processing systems migrate pages between source and destination memory locations indiscriminately without taking into account characteristics of the pages themselves, which often leads to inefficient page migrations and duplication of scarce physical memory resources.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
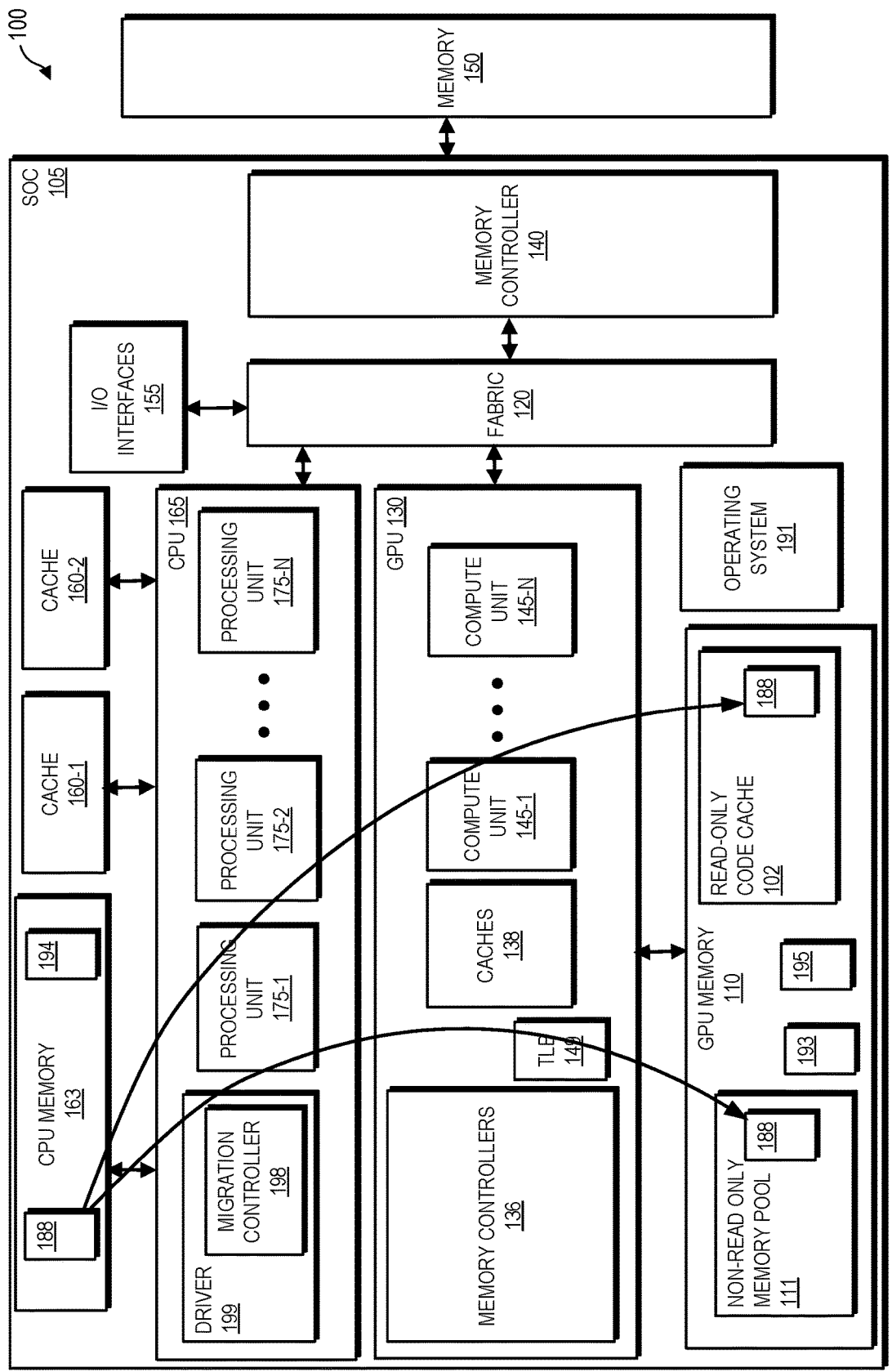
FIG. 1 is a block diagram of a processing system that utilizes read-only-executable-shareable page migration in accordance with some embodiments.

FIGS. 1-4 illustrate embodiments of a processing system that utilizes a read-only executable-shareable page migration scheme. The read-only-executable-shareable page migration scheme utilizes read-only executable and shareable characteristics of a page to migrate the page from a first memory to a second memory. In some embodiments, the first memory is a central processing unit (CPU) memory (hereinafter also referred to as "CPU memory") primarily associated with a first processor (hereinafter also referred to as "CPU")) and the second memory is a graphics processing unit (GPU) memory (hereinafter also referred to as "GPU memory") primarily associated with a second processor or coprocessor (hereinafter also referred to as "GPU"). A migration controller located in, for example, a driver executed at the first processor or an operating system of the processing system, determines whether a page being requested for migration is a read-only-executable-shareable page or a non-read-only-executable-shareable page. The read-only-executable-shareable page is a page that represents read-only code for execution that is shareable by multiple processes executing on the coprocessor. A non-read-only-executable-shareable page is a page that does not represent shareable read-only code for execution and generally includes data buffers used by applications executing on the GPU for computing purposes. When the migration controller determines that the page is a non-read-only-executable-shareable page, the page is migrated to a non-read-only memory pool located in the coprocessor memory. When the migration controller determines that the page is a read-only-executable-shareable page, the page is migrated to a read-only-executable-shareable code cache located in coprocessor memory. The read-only-executable-shareable-code cache differs from other caches in that, for example, the read-only-executable-shareable code cache only stores pages that are read-only, executable, and shareable by multiple processes executing on the coprocessor. As the read-only-executable-shareable pages are migrated to the read-only-executable-shareable code cache, migration controller configures the multiple processes to reference the read-only-executable-shareable code cache when accessing the read-only-executable-shareable pages, instead of the non-read-only-executable-shareable code cache. As a result of having read-only-executable-shareable pages located in a read-only-executable-shareable code cache in the coprocessor memory, multiple processes executing on the coprocessor are able to share the read-only-executable-shareable pages that are located in the read-only-executable-shareable code cache, rather than having the first processor repeatedly allocate different memory space of the coprocessor memory for the same executable code contained in the read-only-executable-shareable pages to each process and thereby wasting valuable space in coprocessor memory.

In addition to migrating the read-only-executable-shareable pages to a read-only-executable-shareable code cache, during the read-only-executable-shareable page migration process, the migration controller monitors the size of the coprocessor code cache relative to the size of the plurality of read-only-executable-shareable pages that have been migrated to the read-only-executable-shareable code cache (read-only code cache). When the size of the plurality of read-only-executable-shareable pages reaches a specified threshold (e.g., a specified maximum storage capacity of the coprocessor code cache), the migration controller increases the size of the read-only-executable-shareable code cache or evicts cold pages (e.g., pages that have not been recently used by the processing system) from the read-only-executable shareable code cache to account for the increased size of the plurality of read-only-executable-shareable pages.

Thus, in some embodiments, in addition to being able to dynamically adjust the size of the read-only code cache, the migration controller is able to identify whether a page to be migrated includes read-only code that is executable and shareable by multiple processors at a coprocessor. After the migration controller identifies if the page is read-only code that is executable and shareable, migration controller migrates the read-only code to a read-only cache code region in the coprocessor's memory that is designated as accessible my multiple processes. The migration controller configures one or more processes to refer to the page's location in the read-only cache code region so that the multiple processes execute the code contained therein, which results in only one copy of the code needing to be stored in the memory, rather than a separate copy for each process.

For ease of illustration, the following description refers frequently to implementations of a coprocessor as a GPU. However, the present disclosure is not limited to this example context, but instead is applicable to any of a variety of coprocessors, including application-specific integrated circuits (ASICs) for machine learning and artificial intelligence applications, and the like, using the guidelines provided herein. As such, reference to a GPU as the coprocessor also applies to other types of coprocessors unless explicitly indicated.

FIG. 1 illustrates a block diagram of a processing system 100 that utilizes read-only-executable-shareable page migration in accordance with some embodiments. Processing system 100 includes system on chip (SoC) 105 coupled to memory 150. SoC 105 can also be referred to as an integrated circuit (IC).

In one embodiment, SoC 105 includes a CPU 165, input/output (I/O) interfaces 155, caches 160-1 and 160-2, fabric 120, graphics processing unit (GPU) 130, GPU memory 110, and memory controller(s) 140. While the SOC 105 is one example embodiment, in other embodiments the GPU 130 and/or the GPU memory 110 are implemented off-chip. For ease of illustration, SoC 105 includes other well-known components omitted from FIG. 1.

CPU 165 includes processing units 175-1-N and a driver 199. Processing units 175-1-N are representative of any number and type of processing units, such as CPU cores, digital signal processing (DSP) cores, and the like. Processing units 175-1-N of CPU 165 are coupled to caches 160-1 and 160-2 and fabric 120. In some embodiments, CPU 165 executes the driver 199 implemented as a set of executable instructions stored in memory 150. In some embodiments, driver 199 is implemented as part of an operating system (OS) 191 executed by the CPU 165, as a driver for controlling operation of the GPU 130, and the like. In one embodiment, driver 199 includes a migration controller 198 for controlling at least a part of the read-only-executable-shareable page migration scheme described in greater detail below.

In some embodiments, processing system 100 is a computer, laptop, mobile device, server or any of various other types of processing systems or devices. It is noted that the number of components of processing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that in some embodiments, processing system 100 and/or SoC 105 includes other components not shown in FIG. 1. Additionally, in other embodiments, processing system 100 and SoC 105 is structured in other ways than shown in FIG. 1.

In one embodiment, processing units 175-1-N are configured to execute instructions of a particular instruction set architecture (ISA). Each processing unit 175-1-N includes one or more execution units, cache memories, schedulers, branch prediction circuits, and so forth. In one embodiment, the processing units 175-1-N are configured to execute the main control software of processing system 100, such as an operating system. Generally, software executed by processing units 175-1-N during use can control the other components of processing system 100 to realize the functionality of processing system 100 described herein. Processing units 175-1-N can also execute other software, such as application programs.

GPU 130 includes at least memory controllers 136, cache(s) 138, translation lookaside buffer (TLB) 149, and compute units 145-1-N. Compute units 145-1-N are representative of any number and type of compute units that are used for graphics or general-purpose processing. Each compute unit 145-1-N includes any number of execution units, with the number of execution units per compute unit varying from embodiment to embodiment. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations. GPU 130 is coupled to fabric 120 and GPU memory 110.

In one embodiment, GPU memory 110 is implemented using high-bandwidth memory (HBM). GPU memory 110 includes read-only-executable-shareable code cache 102 (also referred to as read-only code cache 102), non-read-only-executable-shareable page memory pool 111 (also referred to as non-read only memory pool 111), page table 193, and page table 195. In some embodiments, read-only code cache 102 is a cache that is configured to store read-only-executable-shareable pages. The read-only-executable-shareable pages are migrated from, for example, CPU memory 163. Read-only code cache 102 is unique compared to other caches in that read-only code cache 102 only stores read-only-executable-shareable pages that are shared amongst multiple processes that are executed on GPU 130.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. In different embodiments, the RAM implemented is static RAM (SRAM), dynamic RAM (DRAM), Resistive RAM (ReRAM), Phase Change RAM (PCRAM), or any other volatile or non-volatile RAM, or a combination thereof. The type of DRAM that is used to implement memory 150 includes (but is not limited to) double data rate (DDR) DRAM, DDR2 DRAM, DDR3 DRAM, and the like. Although not explicitly shown in FIG. 1, in some embodiments SoC 105 includes one or more cache memories that are internal to the processing units 175-1-N and/or compute units 145-1-N (e.g., level 1 (L1) caches). In some embodiments, SoC 105 includes caches 160-1- and 160-2 that are utilized by processing units 175-1-N. In one embodiment, caches 160-1 and 160-2 are part of a cache subsystem including a cache controller.

It is noted that the letter "N" when displayed herein next to various structures is meant to generically indicate any number of elements for that structure (e.g., any number of processing units 175-1-N in CPU 165, including one processing unit). Additionally, different references within FIG. 1 that use the letter "N" (e.g., compute units 145-1-N) are not intended to indicate that equal numbers of the different elements are provided (e.g., the number of processing units 175-1-N in CPU 165 can differ from the number of compute units 145-1-N of GPU 130).

In some embodiments, a memory management unit (not shown) includes a translation lookaside buffer (TLB) 149. The memory management unit manages which translations are stored in TLB 149 based on memory access requests made to, for example, GPU memory 110. The TLB 149 caches virtual-to-physical memory address translations. A larger set of virtual-to-physical address translations are stored in page tables (e.g., page tables 193, 194, and 195). In some embodiments, more specifically, the page tables 193, 194, and 195 cache the virtual-to-physical memory address translations for the virtual addresses and physical addresses that correspond to read-only code cache 102. In some embodiments, the memory management unit transfers virtual-to-physical address translations from the page tables (or a higher level of cache than TLB 149) into TLB 149 upon a determination that such translations are likely to be used.

In some embodiments, during operation, page migration is initiated in processing system 100 using a page migration trigger, such as, for example, a memory access or other action such as operating system 191 determining that a page is going to be used in the near future. In some embodiments, operating system 191 is triggered to initiate the page migration by a memory access request from, for example, GPU 130. For example, GPU 130 requests access to a page 188 stored in CPU memory 163 and, in response, operating system 191 determines that a page migration of the requested page 188 is to be performed for the memory access request. In some embodiments, the operating system 191 is notified of the access through, for example, a page fault on the GPU 130.

In order to determine the storage location of the page to be migrated (e.g., page 188 that is to be migrated from CPU memory 163 to either read-only-executable-shareable code cache 102 or non-read-only memory pool 111), migration controller 198 utilizes read-only executable and shareable characteristics of the page 188 that is to be migrated from CPU memory 163 to GPU memory 110. The migration controller 198 that is located in driver 199 of CPU 165 determines whether the page 188 being requested for migration is a read-only-executable-shareable page or a non-read-only-executable-shareable page. That is, migration controller 198 identifies whether a page 188 to be migrated from CPU memory 163 to GPU memory 110 contains read-only code that is executable and shareable by multiple processes executing on GPU 130.

In some embodiments, migration controller 198 identifies or determines whether page 188 is a read-only-executable-shareable page or a non-read-only-executable-shareable page by assessing a read-only, execute-only, and shareable-only characteristic of the page that is being migrated. That is, in some embodiments, each page is labeled as an execute-only, read-only, or shareable-only. In some embodiments, indication of a page as an execute-only, read-only, shareable-only occurs using a single bit or plurality of bits located on, for example, a page indicator on the page of being migrated. In some embodiments, in response to the migration controller 198 identifying that page 188 is a non-read-only-executable-shareable page, i.e., when migration controller 198 determines page 188 is a non-read-only-executable-shareable page, page 188 is migrated to non-read-only memory pool 111 located in the GPU memory 110.

In response to the migration controller 198 identifying that page 188 is a read-only-executable-shareable page, instead of being migrated to non-read-only memory pool 111, page 188 is migrated to a read-only code cache 102 located in GPU memory 110 that is designated as accessible by multiple processes executing on GPU 130. More specifically, operating system 191 uses migration controller 198 to initiate migration of page 188 from CPU memory 163 to read-only code cache 102. The transfer of page 188 from CPU memory 163 to read-only code cache 102 involves moving page 188 to read-only code cache 102, configuring the one or more processes to refer to the page's location in the read-only cache 102, and providing a notification signal to the other processes that utilize updated page table that the virtual-to-physical mapping has been updated (i.e., issuing TLB shootdowns). To move page 188 to the read-only code cache 102, operating system 191 transmits a request to CPU memory 163 to copy page 188 from CPU memory 163 to read-only code cache 102. Operating system 191 then copies page 188 from CPU memory 163 to read-only code cache 102. Operating system 191 transmits a request to configure the mapping(s) for page 188 in the page table 193, page table 195, and page table 194.

In order to configure the one or more processes executing on GPU 130 to refer to page 188's location in read-only code cache 102, page table 193 (corresponding to a first process) and page table 195 (corresponding to a second process) are updated to map the virtual addresses in the virtual address spaces of each process that correspond to the read-only-executable-shareable page 188 to the physical address in read-only code cache 102. Since page 188 has been moved from CPU memory 163, page table 194 of CPU memory 163 is also updated with the physical location of the transferred page 188. The update to page tables 193 and 195 modifies the virtual-to-physical address translation(s) for the page 188 (or pages when a plurality of pages are being migrated) to point to the destination physical address in read-only code cache 102 for the migrated page instead of the source physical address for the migrated page.

In some embodiments, during the migration process (i.e., the migration of page 188 from CPU memory 163 to read-only code cache 102), migration controller 198 monitors the size of the read-only code cache 102 relative to the size of the plurality of read-only-executable-shareable pages that have been migrated to the read-only code cache 102. If migration controller 198 determines that read-only code cache 102 is at or close to maximum capacity (e.g., by determining that the total number of pages cached at the read-only code cache 102 meets or exceeds a specified threshold), operating system 191 uses migration controller 198 to dynamically adjust the size of the read-only code cache 102 to increase the amount of memory available for additional pages (e.g., for additional pages 188). In some embodiments, if migration controller 198 determines that read-only code cache 102 is at maximum capacity, operating system 191 selects pages from read-only code cache 102 that are to be evicted. For example, operating system 191 evicts "cold pages" from read-only code cache 102, where cold pages are pages that have not been recently accessed (e.g., pages that haven't been accessed in a specific amount of time, as measured by, for example, a specified number of clock cycles or a specified number of accesses to the read-only code cache 102). Thus, when the size of the plurality of read-only-executable-shareable pages reaches a read-only code cache maximum threshold, migration controller 198 either increases the size of the read-only code cache 102 or evicts cold pages from the read-only code cache 102 to account for the storage of the additional migrated read-only-executable-shareable page 188 (or both).

After page 188 has been migrated to read-only code cache 102, the migrated page 188 is available for shared use by the plurality of processes that are executing on GPU 130. For example, as described below with reference to FIG. 2A, in some embodiments, two or more processes executing on GPU 130 have individual virtual address spaces that point to the shared code (e.g., the read-only-executable-shareable pages) that has been migrated to read-only code cache 102. Having multiple processes utilize the shared code reduces memory access latencies since the shared code does not have to be loaded for each individual process. As stated previously, because the read-only-executable-shareable pages are available for shared use by the plurality of processes executing on GPU 130, operating system 191 is not required to re-load the read-only-executable-shareable pages that have been transferred to read-only code cache 102.

Figure 2A:
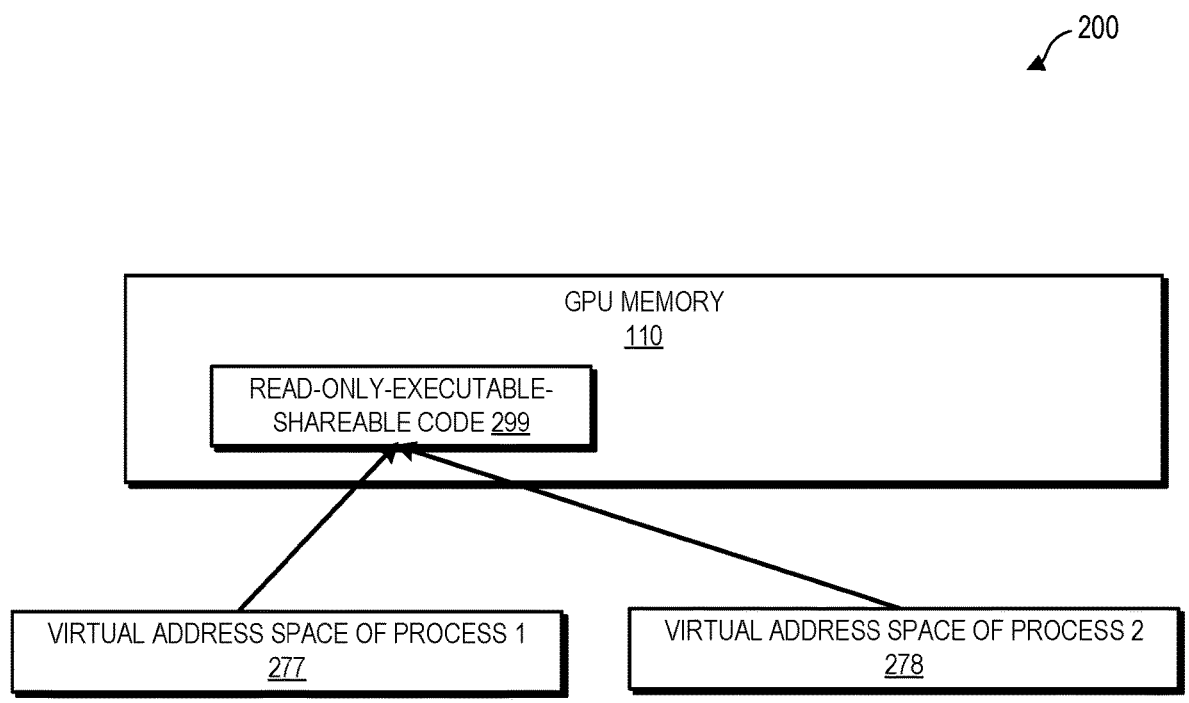
FIG. 2A is a block diagram of a shared code mapping illustrating the sharing of read-only-executable-shareable code used in the processing system of FIG. 1 in greater detail in accordance with some embodiments.

FIG. 2A illustrates a shared code mapping 200 of the read-only-executable-shareable page migration scheme implemented in FIG. 1. Shared code mapping 200 depicts the virtual address spaces (virtual address space 277 and virtual address space 278) of a plurality of processes (process 1 and process 2) executing on GPU 130 that are mapped to a single read-only-executable-shareable code 299. In some embodiments, with further reference to FIG. 1, the read-only-executable-shareable code 299 includes a plurality of read-only-executable-shareable code pages 188. Using, for example, page table 193 for virtual-address-to-physical-address translations for the first process and page table 195 for virtual-address-to-physical translations for the second process, each virtual address space is mapped to the same single read-only-executable-shareable code 299, preventing the migration controller 198 from having to transfer multiple copies of the same code for execution by process 1 and process 2. As stated previously, the update to page tables 193 and 195 has allowed the virtual-to-physical address translations for the read-only-executable-shareable code 299 (a page or plurality of pages of read-only-executable-shared code) to point to the destination physical address in read-only code cache 102.

Figure 2B:
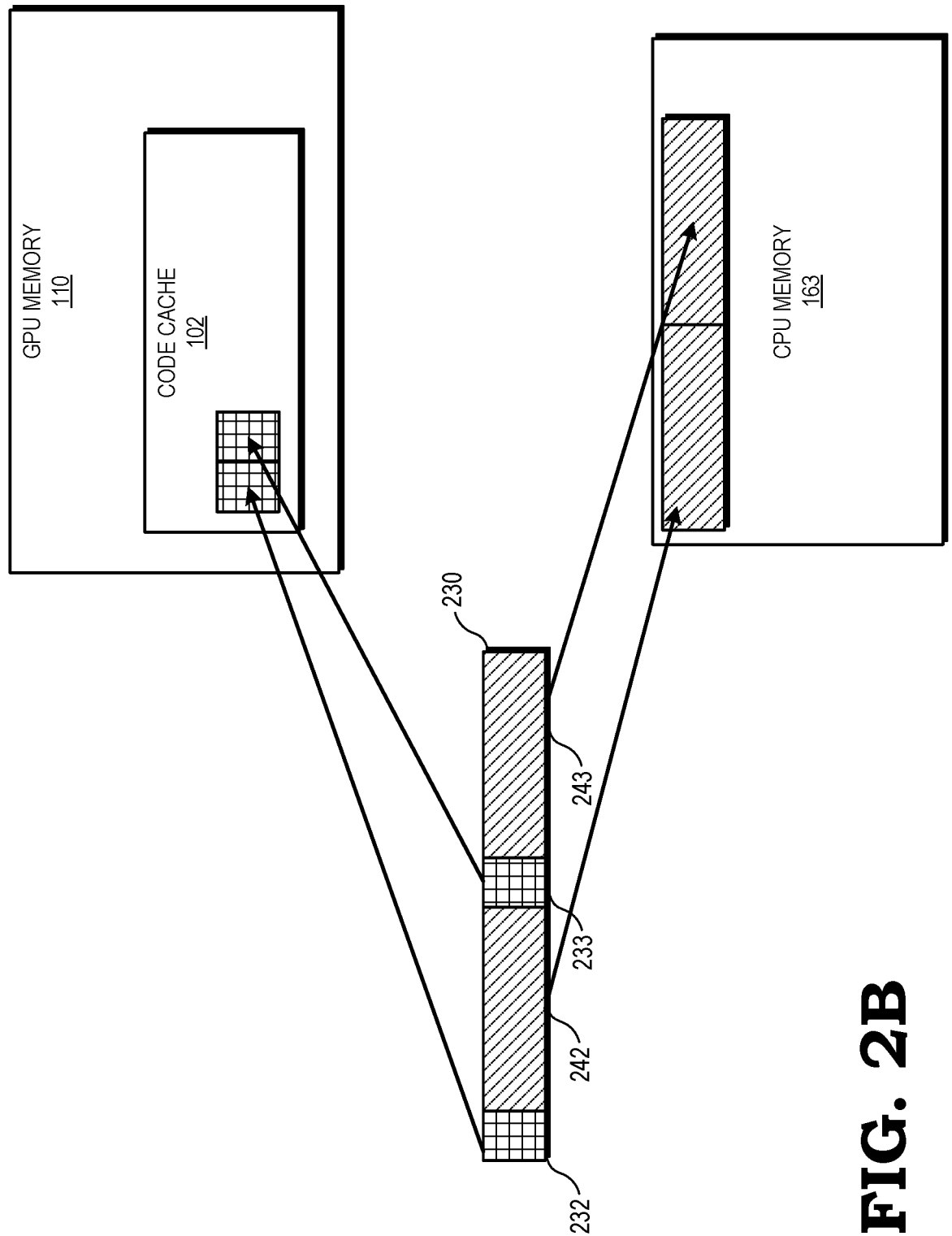
FIG. 2B is a block diagram illustrating a portion of the processing system of FIG. 1 in greater detail in accordance with some embodiments.

FIG. 2B is a block diagram illustrating a portion of the processing system 100 of FIG. 1 in greater detail in accordance with some embodiments. The portion of the processing system 100 depicted in FIG. 2B includes GPU memory 110 and CPU memory 163. FIG. 2B depicts a portion of GPU virtual address space 230 that includes "hot" read-only-executable-shareable pages 232 and 233 (e.g., pages that have been recently used by the processing system 100) and cold-read-only-executable-shareable pages 242 and 243 (e.g., pages that have not been recently used by the processing system 100) that correspond to, for example, shader code that is to be read and executed by processes executing on GPU 130. As depicted, the hot read-only-executable-shareable pages 232 and 233 are mapped in page table 193 to read-only code cache 102. The cold read-only-executable-shareable pages 242 and 243 are mapped to CPU memory 163. In response to a page fault to page table 193 that is triggered by a memory access to the cold read-only-executable-shareable pages 242 and 243, the cold read-only-executable-shareable pages 242 and 243 are migrated from CPU memory 163 to read-only code cache 102 of GPU memory 110 as described with reference to FIG. 3 below.

Figure 3:
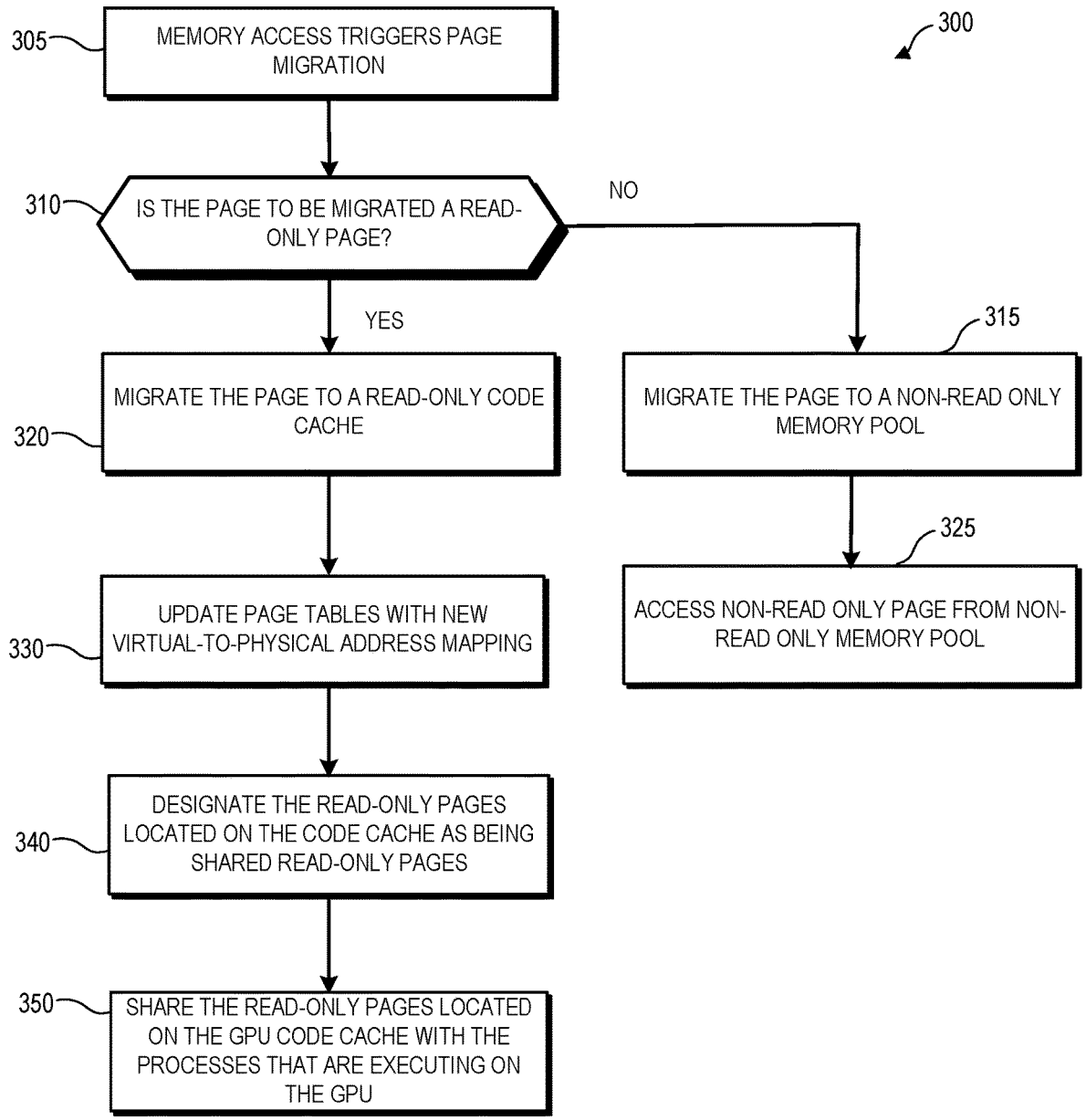
FIG. 3 is a flow diagram illustrating a method for performing read-only page migration in the processing system of FIG. 1 in accordance with some embodiments.

FIG. 3 is a flow diagram of a method 300 for migrating memory pages using read-only-executable-shareable page migration. Although described with respect to the system shown and described with respect to FIGS. 1-2, it should be understood that any system configured to perform the method, in any technically feasible order, falls within the scope of the present disclosure.

As depicted, the method 300 commences at block 305 with the OS 191 triggering a page migration. In some embodiments, as stated previously, the trigger can be a memory access or another action, such as, for example, operating system 191 determining that page 188 (or pages) should be migrated from CPU memory 163 to GPU memory 110 according to predicted future use of the page 188. At block 310, migration controller 198 identifies or determines whether the page 188 to be migrated is a read-only-executable-shareable page or a non-read-only-executable-shareable page. The determination of whether the page to be migrated is a read-only-executable-shareable page or a non-read-only-executable-shareable page involves, for example, assessing a bit-configuration located in the page to be migrated that indicates whether the page is a read-only page, shareable-only page, and/or executable-only page.

At block 315, when migration controller 198 determines that the page is not a read-only-executable-shareable page at block 310, the page is migrated to non-read only memory pool 111. At block 325, the multiple processes executing on GPU 130 access the non-read-only-executable-shareable pages individually from non-read only memory pool 111. That is, the non-read-only-executable-shareable pages are not shared amongst the multiple process executing on GPU 130.

At block 320, when migration controller 198 determines that the page is a read-only-executable-shareable page at block 310, the page is migrated to read-only code cache 102. At block 330, the page tables (e.g., page table 193, page table 195, and page table 194) are updated with the updated physical address of the page (or pages for a plurality of pages) that has been migrated. At block 340, the read-only-executable-shareable page that has been migrated to read-only code cache 102 is designated or identified as a shared read-only-executable-shareable page. In some embodiments, the designation of the page as a read-only-executable-shareable page is by way of a bit embedded in the page that is set to indicate that the page is a read-only-executable-shareable page. At block 350, the read-only-executable-shareable page is shared amongst the plurality of processes that are executing on GPU 130. For example, during a read request by a process executing on GPU 130, the read-only executable code on the read-only-executable-shareable page or read-only-executable-shareable pages is available for execution by the one or more processes executing on GPU 130. That is, in some embodiments, both the virtual address space of a first process executing on GPU 130 and the virtual address space of a second process executing on GPU 130 are mapped using page table 193 and page 195 to the same read-only-executable-shareable pages (e.g., read-only GPU code) stored in the read-only code cache 102. As a result, the read-only-executable-shareable page migration scheme able to optimize instruction memory footprint for multiple processes that share, for example, the same shader code, by mapping the same physical code pages to the virtual address space of each process without duplicating physical memory. In some embodiments, the read-only-executable-shareable page migration scheme reduces the memory footprint when sharing code between multiple processes by sharing the read-only portions of a GPU executable among the plurality of processes executing on, for example, GPU 130. In some embodiments, the memory footprint is reduced by a factor of N, where N is the number of processes sharing the GPU 130 and executing the same code represented by the read-only-executable-shareable pages that have been migrated to read-only code cache 102.

Figure 4:
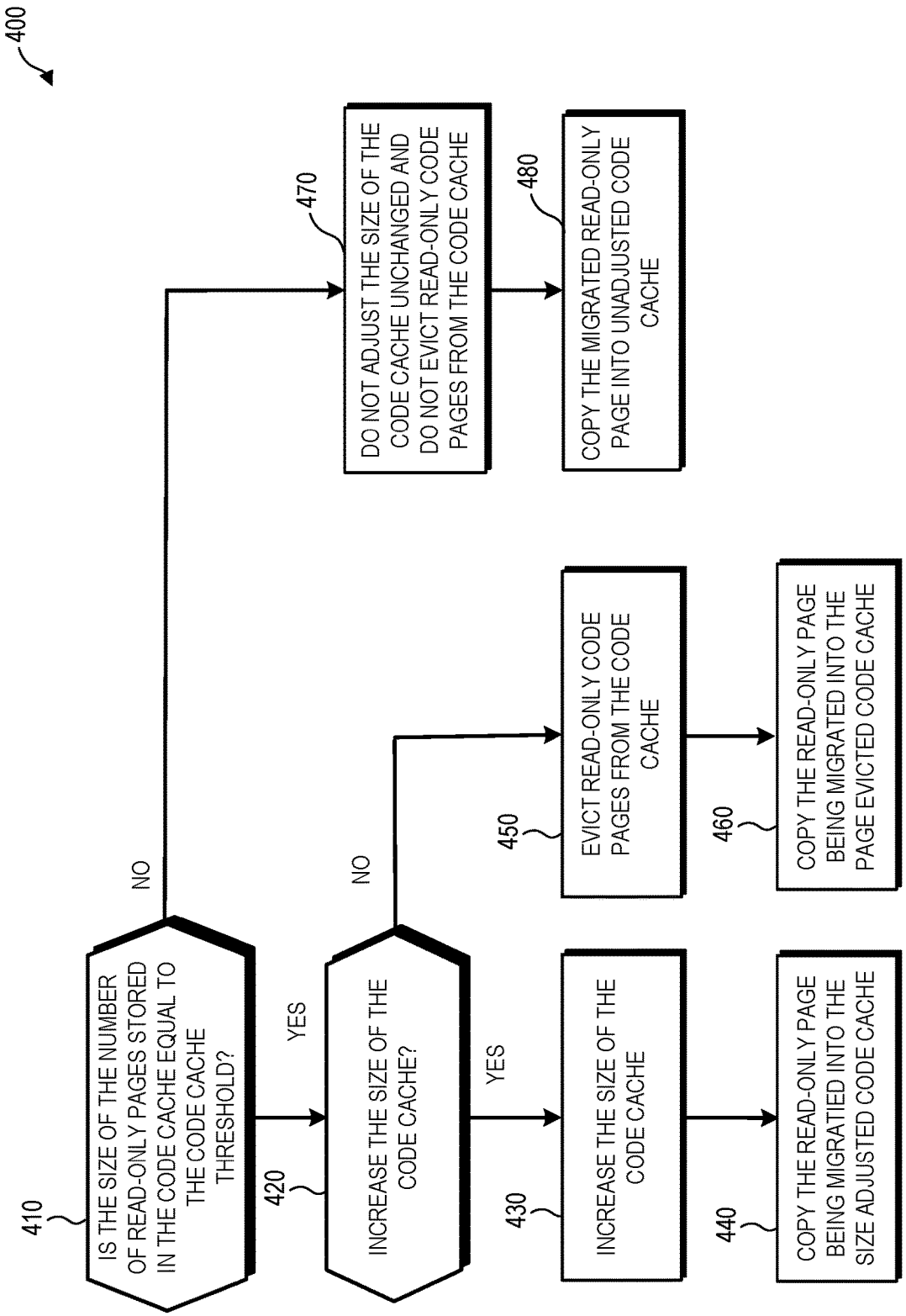
FIG. 4 is a flow diagram illustrating a method for adjusting a size of a read-only cache during read-only page migration in the processing system of FIG. 1 in accordance with some embodiments.

FIG. 4 is a flow diagram of a method 400 for adjusting the size of read-only code cache 102 during read-only-executable-shareable page migration. Although described with respect to the system shown and described with respect to FIGS. 1-3, it should be understood that any system configured to perform the method, in any technically feasible order, falls within the scope of the present disclosure.

As depicted, the method 400 commences at block 410, where migration controller 198 determines whether the size of the read-only-executable-shareable pages that have been stored in read-only code cache 102 is equal to the read-only code cache threshold (e.g., a maximum capacity of the read-only code cache 102). In some embodiments, the threshold is set by the user of the processing system 100. In some embodiments, the threshold is represented as a fixed memory capacity or as a percentage of the total memory capacity of the read-only code cache 102.

In some embodiments, at block 410, when the size of the number of read-only-executable-shareable pages stored in read-only code cache 102 is equal to the read-only code cache threshold, at block 420, migration controller 198 determines whether to increase the size of the read-only code cache 102, or evict the read-only-executable-shareable pages from the read-only code cache 102. In some embodiments, the user of processing system 100 dictates to migration controller 198 whether to increase the size of the read-only code cache 102 or evict the read-only-executable-shareable pages from the read-only code cache 102. In addition, in some embodiments, the user of processing system 100 dictates the amount of memory by which to increase the size of the read-only code cache 102 and the number of cold read-only-executable-shareable pages to evict.

At block 430, when migration controller 198 determines to increase the size of the read-only code cache 102 at block 420, migration controller 198 increases the size of the read-only code cache 102 to account for additional read-only-executable-shareable pages that are to be stored in read-only code cache 102. At block 440, migration controller 198 copies the read-only-executable-shareable page into the size adjusted read-only-code cache 102.

Turning to block 450, when migration controller 198 determines not to increase the size of the read-only code cache 102 at block 420, migration controller 198 evicts read-only-executable-shareable pages from the read-only code cache 102. In some embodiments, migration controller 198 evicts cold read-only-executable-shareable pages from read-only code cache 102, but the user of processing system 100 can program migration controller 198 to evict read-only-executable-shareable pages from read-only code cache 102 for other reasons. At block 460, the read-only-executable-shareable page is copied into the page evicted read-only code cache 102.

Returning back to block 410, when the size of the number of read-only-executable-shareable pages stored in read-only code cache 102 is not equal to the read-only code cache threshold, at block 470, migration controller 198 allows the size of read-only code cache 102 to remain unchanged for further storage of migrated read-only-executable-shareable pages. At block 480, migration controller 198 copies the read-only-executable-shareable page to the unadjusted read-only code cache 102.

In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools typically are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device can be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

In various embodiments, a method includes, in response to a page migration trigger for a page present in a first memory associated with a first processor, responsive to the page being a read-only page storing code for execution, migrating the page to a code cache portion of a second memory associated with a second processor and shared by multiple processes executing at the second processor, and configuring each process of a set of processes executing at the second processor to access and execute the code from the code cache portion. In some embodiments, the method further includes, responsive to the page not being the read-only page storing code for execution, migrating the page to a non-code cache portion of the second memory. In some embodiments, the method further includes, identifying whether the page is the read-only page storing code for execution by using a page indicator indicative of whether the page is the read-only page, an execute-only page, or a read-write page.

In some embodiments of the method, migrating the page to a code cache portion includes, copying the read-only page to the code cache portion, updating a page table of a plurality of page tables with a virtual-address-to-physical-address mapping of the read-only page, and providing a notification signal to the multiple processes that indicates that the virtual-address-to physical address mapping of the read-only page has been updated. In some embodiments of the method, updating the page table includes inserting a page table entry into the page table of the second memory in response to the migration of the page into the code cache portion. In some embodiments, the method further includes creating a read-only mapping in a virtual address space of a first process of the multiple processes, wherein the read-only mapping occurs after text relocations in the read-only page. In some embodiments, the method further includes, in response to a code cache threshold assessment, determining whether to a adjust a maximum size of the code cache portion or evict at least a currently cached read-only page from the code cache portion. In some embodiments of the method, the first processor is a central processing unit (CPU) and the second processor is a graphical processing unit (GPU). In some embodiments of the method, the first processor is a central processing unit (CPU) and the second processor is an application-specific integrated circuit (ASIC).

In some embodiments, a processing system includes a first processor couplable to a first memory and a second memory, wherein in response to a page migration trigger for a page in the first memory, the first processor is configured to, responsive to the page being a read-only page storing code for execution, initiate migration of the page to a code cache portion of a second memory associated with a second processor and shared by multiple processes executing at the second processor, and to configure each process of a set of processes executing at the second processor to access and execute the code from the code cache portion.

In some embodiments of the processing system, responsive to the page not being the read-only page storing code for execution, the page is migrated by the first processor to a separate portion of the second memory. In some embodiments of the processing, a page indicator, indicative of whether the page is the read-only page, an execute-only page, or a read-write page, is used to identify whether the page is the read-only page storing code for execution.

In some embodiments of the processing system, the migration of the page to a code cache portion includes the read-only page being copied to the code cache portion, a page table of a plurality of page tables being updated with a virtual-address-to-physical-address mapping of the read-only page, and a notification signal is provided to the multiple processes that indicates that the virtual-address-to physical address mapping of the read-only page has been updated. In some embodiments of the processing system, a page table entry of the page table is used to map a virtual address of the page to a physical address in a page table of the code cache portion. In some embodiments of the processing system, a read-only mapping is created in a virtual address space of a process of the multiple processes, wherein the read-only mapping occurs after text relocations in the read-only page.

In some embodiments of the processing system, in response to a code cache threshold assessment, the first processor determines whether to adjust a maximum size of the code cache portion or evict at least a currently cached read-only page from the code cache portion. In some embodiments of the processing system, the first processor is a central processing unit (CPU) and the second processor is a graphical processing unit (GPU).

In some embodiments, a method includes migrating a plurality of read-only pages from a first memory associated with a first processor to a code cache of a second memory associated with a second processor, the code cache being used to store read-only pages that are shareable, executable, and accessible among a plurality of processes executing on the second processor, monitoring a size of the code cache relative to a size of the plurality of read-only pages, and in response to the size of the plurality of read-only pages being greater or equal to a code cache threshold, increasing the size of the code cache to account for the increase in size of the plurality of read-only pages or evicting a plurality of cold read-only pages from the code cache.

In some embodiments, the method further includes, in response to the size of the plurality of read-only pages not being greater or equal to the code cache threshold, keeping the size of the code cache unchanged. In some embodiments, the method further includes migrating a plurality of non-read-only pages to a non-read-only code cache.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method, comprising:
receiving a page migration trigger for a page present in a first memory associated with a first processor; and
responsive to the page migration trigger:
when the page is a read-only page storing code for execution:
migrating the page to a code cache portion of a second memory associated with a second processor and shared by multiple processes executing at the second processor;
configuring each process of a set of processes executing at the second processor to access and execute the code from the code cache portion; and
creating a read-only mapping in a virtual address space of a first process of the multiple processes, wherein the read-only mapping occurs after text relocations in the read-only page; and
when the page is a non-read-only page not storing code for execution, migrating the page to a non-code cache portion of the second memory.

2. The method of claim 1, further comprising:
identifying whether the page is the read-only page storing code for execution by using a page indicator indicative of whether the page is the read-only page, an execute-only page, or a read-write page.

3. The method of claim 1, wherein migrating the page to a code cache portion includes:
copying the read-only page to the code cache portion;
updating a page table of a plurality of page tables with a virtual-address-to-physical-address mapping of the read-only page; and
issuing a notification signal to the multiple processes that indicates that the virtual-address-to physical address mapping of the read-only page has been updated.

4. The method of claim 3, wherein updating the page table includes:
inserting a page table entry into the page table of the second memory in response to the migration of the page into the code cache portion.

5. The method of claim 1, further comprising:
in response to a code cache threshold assessment, determining whether to adjust a maximum size of the code cache portion or evict at least a currently cached read-only page from the code cache portion.

6. The method of claim 1, wherein:
the first processor is a central processing unit (CPU) and the second processor is a graphical processing unit (GPU).

7. The method of claim 1, wherein:
the first processor is a central processing unit (CPU) and the second processor is an application-specific integrated circuit (ASIC).

8. A processing system, comprising:
a first processor couplable to a first memory and a second memory, wherein, after receiving a page migration trigger for a page in the first memory, the first processor is configured to:
responsive to the page migration trigger:
when the page is a read-only page storing code for execution, initiate migration of the page to a code cache portion of a second memory associated with a second processor and shared by multiple processes executing at the second processor, and configure each process of a set of processes executing at the second processor to access and execute the code from the code cache portion, wherein a read-only mapping is created in a virtual address space of a process of the multiple processes, and the read-only mapping occurs after text relocations in the read-only page; and
when the page is a non-read-only page not storing code for execution, the page is migrated by the first processor to a separate portion of the second memory.

9. The processing system of claim 8, wherein:
a page indicator, indicative of whether the page is the read-only page, an execute-only page, or a read-write page, is used to identify whether the page is the read-only page storing code for execution.

10. The processing system of claim 8, wherein the migration of the page to a code cache portion includes:
the read-only page being copied to the code cache portion;
a page table of a plurality of page tables being updated with a virtual-address-to-physical-address mapping of the read-only page; and
a notification signal is issued to the multiple processes that indicates that the virtual-address-to physical address mapping of the read-only page has been updated.

11. The processing system of claim 10, wherein:
a page table entry of the page table is used to map a virtual address of the page to a physical address in a page table of the code cache portion.

12. The processing system of claim 8, wherein:
in response to a code cache threshold assessment, the first processor determines whether to adjust a maximum size of the code cache portion or evict at least a currently cached read-only page from the code cache portion.

13. The processing system of claim 8, wherein:
the first processor is a central processing unit (CPU) and the second processor is a graphical processing unit (GPU).

14. A method, comprising:
migrating one or more read-only pages from a first memory associated with a first processor to a code cache of a second memory associated with a second processor, the code cache being used to store read-only pages that are shareable, executable, and accessible among a plurality of processes executing on the second processor;
monitoring a size of the code cache relative to a size of the one or more read-only pages; and
in response to the size of the one or more read-only pages being greater or equal to a code cache threshold, increasing the size of the code cache to account for the increase in size of the one or more read-only pages or evicting a plurality of cold read-only pages from the code cache;
creating a read-only mapping in a virtual address space of a first process of the plurality of processes, wherein the read-only mapping occurs after text relocations in a read-only page; and
migrating one or more non-read-only pages to a non-read-only code cache.

15. The method of claim 14, further comprising:
in response to the size of the one or more read-only pages not being greater or equal to the code cache threshold, keeping the size of the code cache unchanged.

* * * * *